United States Patent
Spencer

(10) Patent No.: US 11,780,568 B2
(45) Date of Patent: Oct. 10, 2023

(54) AIRPLANE WHEEL PREROTATION/LANDING BRAKE COOLING DEVICE

(71) Applicant: David Hoady Spencer, Seattle, WA (US)

(72) Inventor: David Hoady Spencer, Seattle, WA (US)

( * ) Notice: Subject to any disclaimer, the term of this patent is extended or adjusted under 35 U.S.C. 154(b) by 0 days.

(21) Appl. No.: 16/996,253

(22) Filed: Aug. 18, 2020

(65) Prior Publication Data
US 2023/0047751 A1  Feb. 16, 2023

(51) Int. Cl.
*B64C 25/40* (2006.01)
*F16D 65/847* (2006.01)
*B64C 25/42* (2006.01)
*F16D 65/78* (2006.01)

(52) U.S. Cl.
CPC ........... *B64C 25/40* (2013.01); *B64C 25/42* (2013.01); *F16D 65/847* (2013.01); *B60B 2900/513* (2013.01); *F16D 2065/787* (2013.01)

(58) Field of Classification Search
CPC ....... B64C 25/40; B64C 25/42; F16D 65/847; F16D 65/84; F16D 55/36; F16D 55/38; F16D 55/40
USPC .................................. 301/6.2, 6.3; 244/103 S
See application file for complete search history.

(56) References Cited

U.S. PATENT DOCUMENTS

| | | | | |
|---|---|---|---|---|
| 2,312,159 A | * | 2/1943 | Gulotta | B64C 25/40 244/103 S |
| 3,168,348 A | * | 2/1965 | Fleming | B60B 19/10 301/6.3 |
| 3,958,833 A | * | 5/1976 | Stanton | F16D 65/84 301/6.2 |
| 5,104,063 A | * | 4/1992 | Hartley | B64C 25/40 244/103 S |
| 5,746,393 A | * | 5/1998 | Gennaro | B64C 25/40 244/103 S |
| 7,264,316 B2 | * | 9/2007 | DiMarco | B60B 7/08 301/37.101 |
| 10,300,739 B1 | * | 5/2019 | Saied | B60B 7/0086 |
| 2017/0058981 A1 | * | 3/2017 | Gonzalez | B60T 5/00 |

FOREIGN PATENT DOCUMENTS

GB  2365393 A * 2/2002 ............. B64C 25/40

* cited by examiner

Primary Examiner — Kip T Kotter
(74) Attorney, Agent, or Firm — Thomas E. Loop

(57) ABSTRACT

A detachable airplane wheel prerotation/landing brake cooling device is disclosed that comprises: an outer circular cage rim, an inner circular cage rim confronting and spaced apart from the outer circular cage rim, and a plurality of spaced apart arcuate blades spanning across and connecting the outer circular cage rim to the inner circular cage rim at a slant. Each arcuate blade includes a first section connected to the outer circular cage rim and a second section connected to inner circular cage rim. The plurality of slanted arcuate blades are, when the detachable airplane wheel prerotation/landing brake cooling device is being impinged by an airstream during the landing of the airplane, configured to (i) rotate the wheel about the axle in a forward direction, and (ii) funnel air into the plurality of annular spaces adjacent to the plurality of heat shields to thereby remove heat away from the disc brake assembly.

3 Claims, 6 Drawing Sheets

AIRPLANE WHEEL PREROTATION/LANDING BRAKE COOLING DEVICE

TECHNICAL FIELD

The present invention relates generally to airplane wheel and braking systems, and, more particularly, to airplane wheel prerotation and disc brake cooling systems that extend tire life and enhance safety during landing.

BACKGROUND OF THE INVENTION

In the aviation industry, various devices have been invented over the years to cause the wheels of an airplane to pre-rotate (at relatively high revolutions per minute) just prior to the airplane's landing (typically at speeds ranging from about 135-150 miles per hour). In the absence of prerotation of the wheel (as is, somewhat surprisingly, still common practice with respect to many modern commercial airplanes), then the frictional impact of the stationary tire (positioned about the wheel) against the hard surface of the runway causes a rapid release of heat energy at the point of contact, which, in turn, can cause smoking (i.e., the visible vaporization of rubber) of the tire and, in some instances, skidding of the aircraft across the runway. The smoking of tires and skidding of airplanes are undesirable events for obvious reasons relating to economy and safety.

There are two kinds of brakes in an airplane: air brakes and landing brakes. The landing brakes of most modern commercial airplanes comprise multi-disc brakes. The discs (of the multi-disc brake assembly) rotate as the wheel rotates—but when the landing brakes are applied, a stationary caliper squeezes a plurality of brake pads against opposite faces of each of the discs. The brake pads resist the rotation by causing friction against the discs and, in so doing, liberate significant amounts of heat energy into the surrounding environment. The design of the disc brake system and its complexity is variable from one airplane to another.

It is known that when an airplane lands with its wheels substantially stationary and not rotating, damage to the tires may occur due to frictional forces (that results when the tires impact the ground). This is particularly true for large commercial airplanes. The present invention overcomes these disadvantages by providing a combined means for rapidly prerotating an airplane's rear wheels in the proper direction during landing (thereby reducing the frictional resistance of the tire against the ground), while simultaneously cooling the disc brake system (associated with landing brakes of an airplane).

Although some progress has been made over years, there is still a need in the art for new and improved airplane wheel prerotation systems and methods—including innovative airplane wheel prerotation and brake cooling devices capable of wheel prerotation while also cooling certain brake components. The present invention fulfills these needs and provides for further related advantages.

SUMMARY OF THE INVENTION

In brief, the present invention is directed to a means for rotating (spinning) the wheels of an airplane's rear landing gear in a forward direction prior to impact of the wheels with the ground at the time of landing (thereby reducing the frictional resistance of the tire when it makes contact with the ground), while at the same time providing an enhanced means for cooling of the disc brake assembly (a component of the airplane's landing gear). In a preferred embodiment, the invention is directed to a detachable airplane wheel prerotation/landing brake cooling device that comprises: an outer circular cage rim; an inner circular cage rim confronting and spaced apart from the outer circular cage rim, wherein the inner circular cage rim is fitted to the outer circular wheel rim of the wheel on the inner side of the wheel disk adjacent to the disc brake assembly; and a plurality of spaced apart arcuate blades spanning across and connecting the outer circular cage rim to the inner circular cage rim. Each arcuate blade includes a first section connected to the outer circular cage rim and a second section connected to inner circular cage rim offset from the first section such that each blade is slanted. The plurality of arcuate blades are, when the detachable airplane wheel prerotation/landing brake cooling device is being impinged by an airstream during the landing of the airplane, configured to (i) rotate the wheel about the axle in a forward direction, and (ii) funnel air into the plurality of annular spaces adjacent to the plurality of heat shields to thereby remove heat away from the disc brake assembly.

These and other aspects of the present invention will become more evident upon reference to the following detailed description and attached drawings. It is to be understood, however, that various changes, alterations, and substitutions may be made to the specific embodiments disclosed herein and still be within the scope of the present invention.

BRIEF DESCRIPTION OF THE DRAWINGS

The drawings are intended to be illustrative and symbolic representations of certain exemplary embodiments of the present invention (and as such they are not necessarily drawn to scale). In addition, it is to be expressly understood that the relative dimensions and distances depicted in the drawings (and described in the "Detailed Description of the Invention" section) are exemplary and may be varied in numerous ways without departing from the scope of the invention (as defined by the claims). Finally, like reference numerals have been used to designate like features throughout the several views of the drawings.

DETAILED DESCRIPTION OF THE INVENTION

Figure 1:
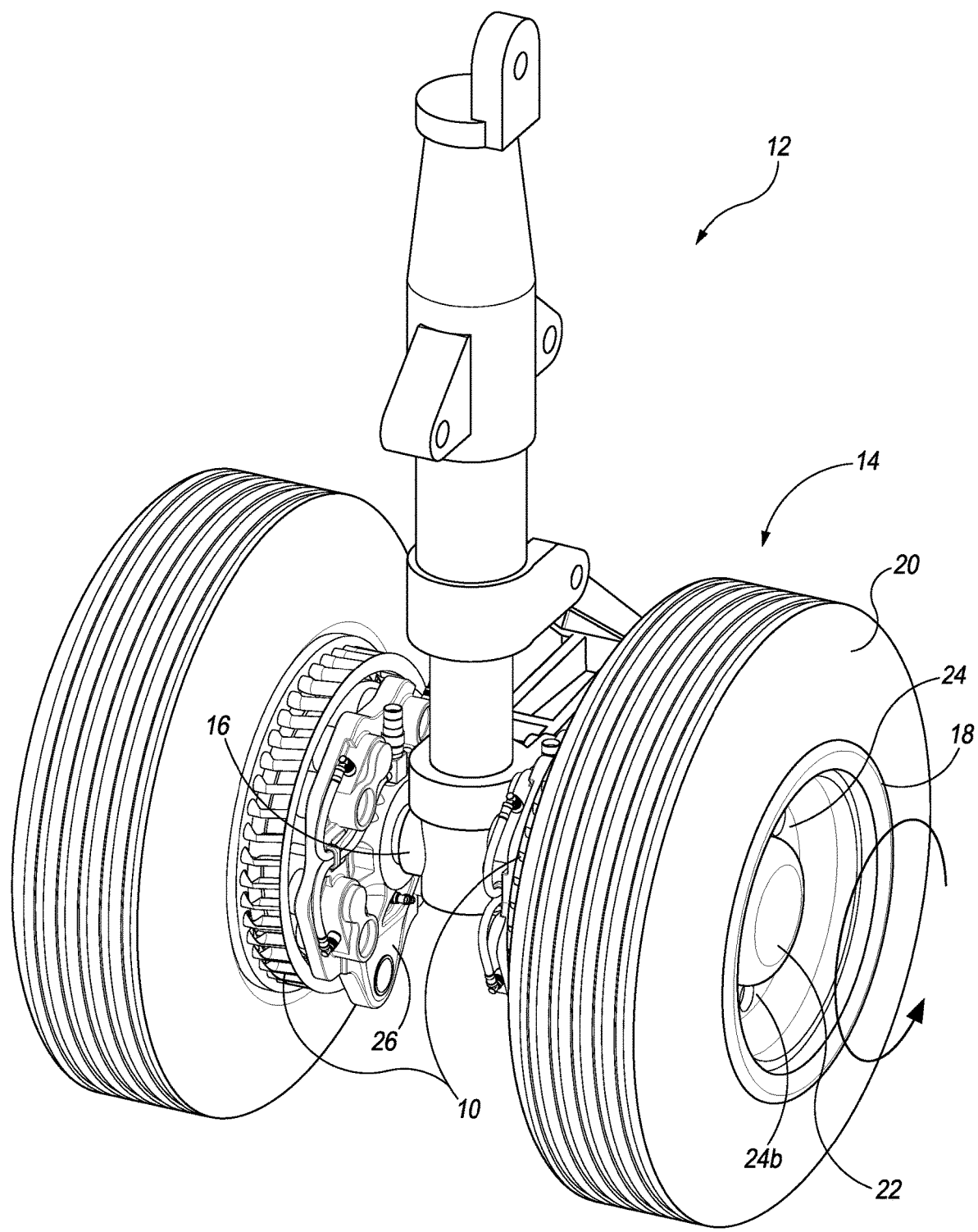
FIG. 1 is an elevated partial perspective view of a detachable airplane wheel prerotation/landing brake cooling device (partially hidden from view) in combination with a landing gear assembly of an airplane in accordance with an embodiment of the invention.

In the following detailed description, reference is made to the accompanying drawings, which form a part hereof. In the drawings, similar symbols or markings have been used to identify like or corresponding elements, unless context dictates otherwise. The illustrative embodiments described in the detailed description, drawings, and claims are not meant to be limiting. Other embodiments may be utilized, and other changes may be made, without departing from the spirit or scope of the invention disclosed herein.

Figure 2:
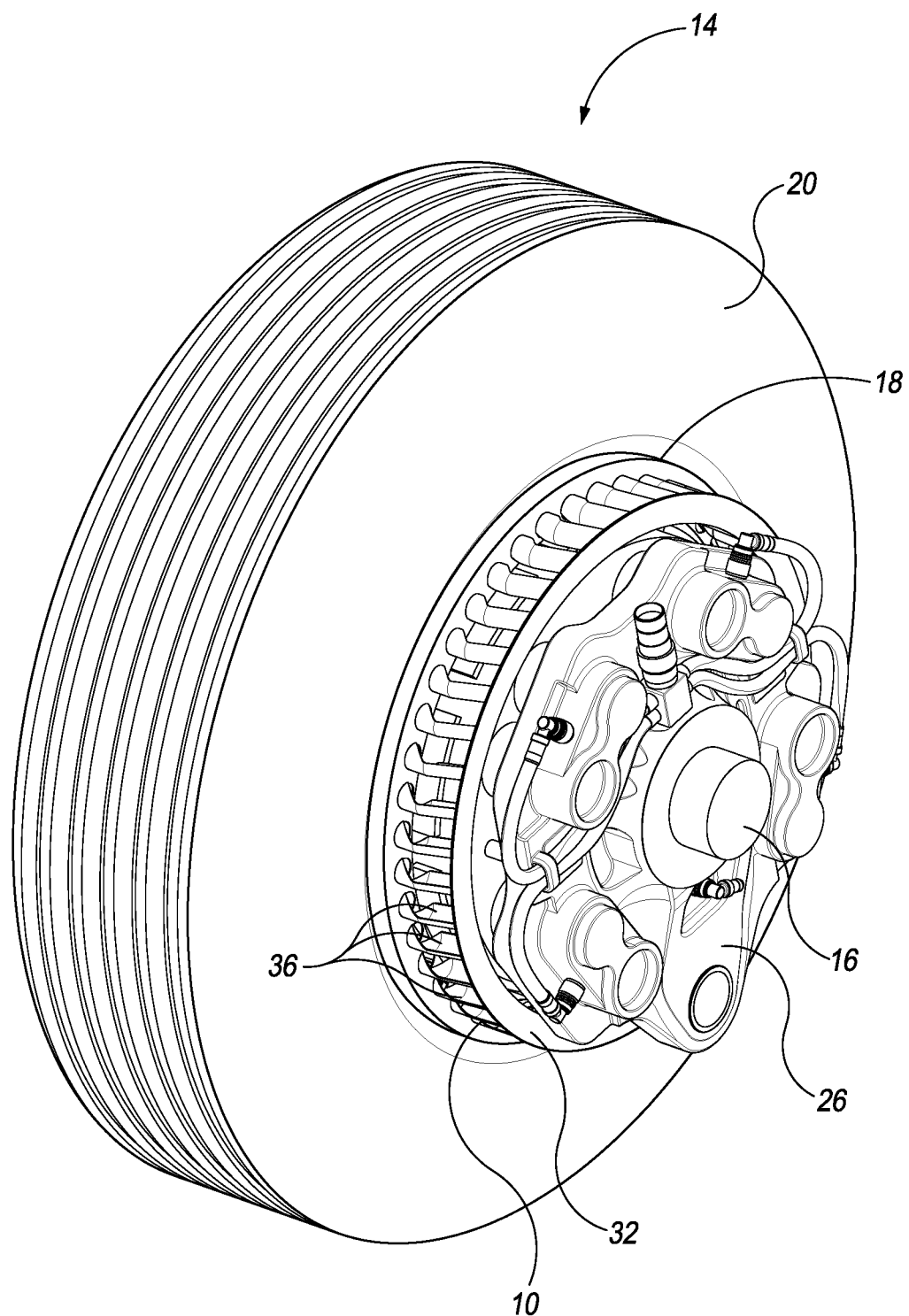
FIG. 2 is a partial perspective view of a detachable airplane wheel prerotation/landing brake cooling device in combination with a wheel, an axle, and a multi-disc brake assembly of an airplane in accordance with an embodiment of the invention.

The invention disclosed herein is directed to a means for rotating (spinning) the wheels of an airplane's rear landing gear in a forward direction prior to impact of the wheels with the ground at the time of landing (thereby reducing the frictional resistance of the tire when it makes contact with the ground), while at the same time providing an enhanced means for cooling of the disc brake assembly (of the airplane's landing gear). Thus, and with reference to FIGS. 1-6, the present invention in an embodiment is directed to a detachable airplane wheel prerotation/landing brake cooling device 10 in combination with a landing gear assembly 12 of an airplane (not shown). As best shown in FIGS. 1 and 2, the landing gear assembly 12 includes a rotatable wheel 14 positioned about an axle 16, wherein the wheel 14 includes an outer circular wheel rim 18, a tire 20 about the wheel rim 18, an inner hub 22, and a wheel disk 24 connecting the inner hub 22 to the outer wheel rim 18. As shown, the wheel disk has an inner side 24a (facing towards the longitudinal axis of the airplane) and an outer side 24b (facing away from the longitudinal axis of the airplane).

Figure 3:
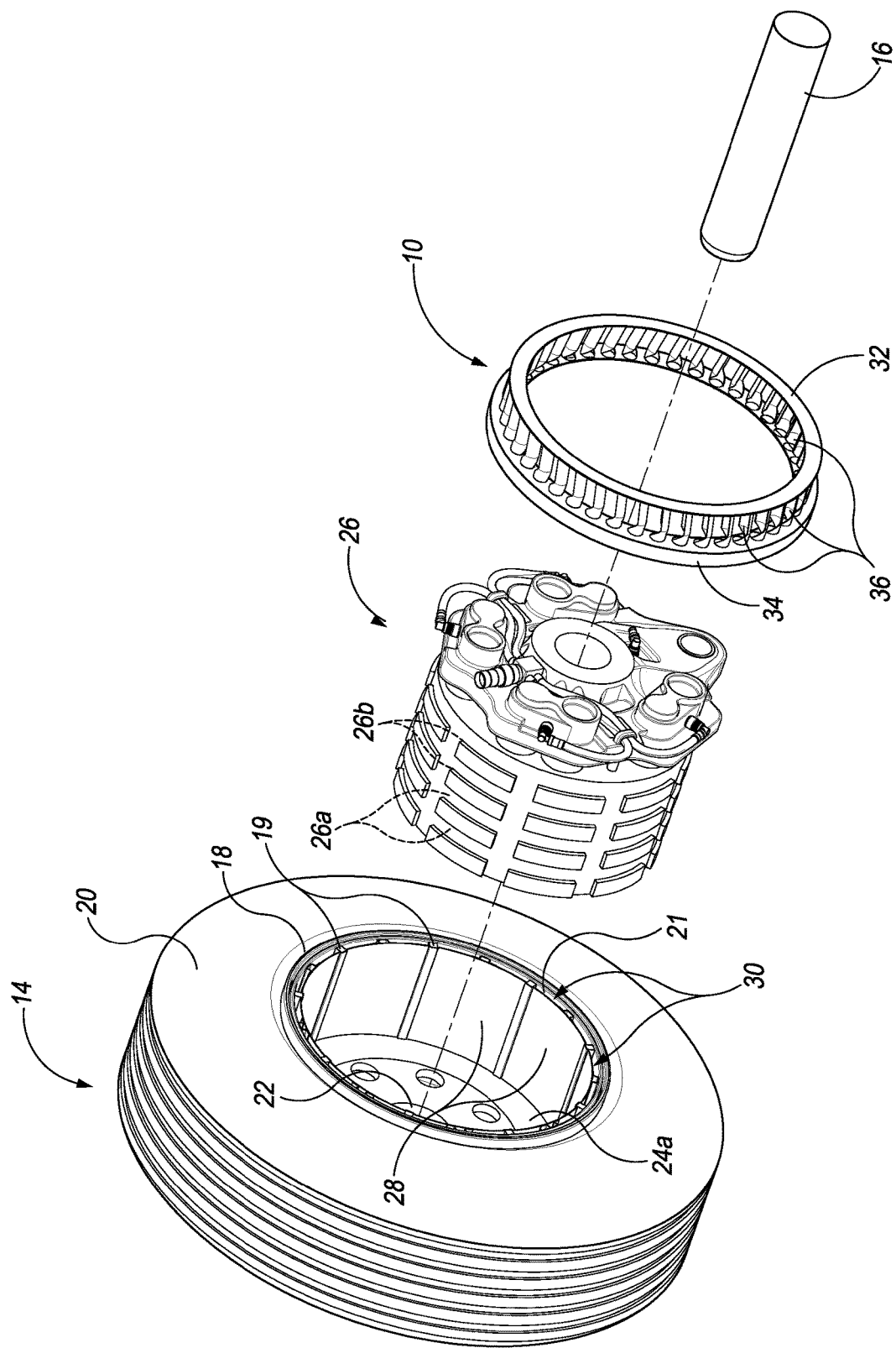
FIG. 3 is a partial exploded perspective view of a detachable airplane wheel prerotation/landing brake cooling device in combination with a wheel and a disc brake assembly of an airplane shown in FIG. 2.

As best shown in FIGS. 2 and 3, the landing gear assembly 12 includes a disc brake assembly 26 positioned adjacent to the inner side 24a of the wheel disk 24. As shown, the disc brake assembly 26 includes a plurality of brake pads 26a positioned on opposite sides of a plurality disc brake rotors 26b axially aligned with the axle 16, as well as a plurality of curved metal heat shields 28 circumferentially about the axle 16 and adjacent to, and between, the outer wheel rim 18 and the axially aligned disc brake rotors 26b. The plurality of curved heat shields 28 are positioned on, and supported by, a plurality of support members 19 that traverse the width of the wheel rim 18. In this configuration a plurality of curved annular spaces 30 is defined between the outer wheel rim 18 and the plurality of curved heat shields 28. The plurality of curved annular spaces 30 accumulate heat liberated from the disc brake assembly 26 during braking of the airplane while landing.

Figure 4:
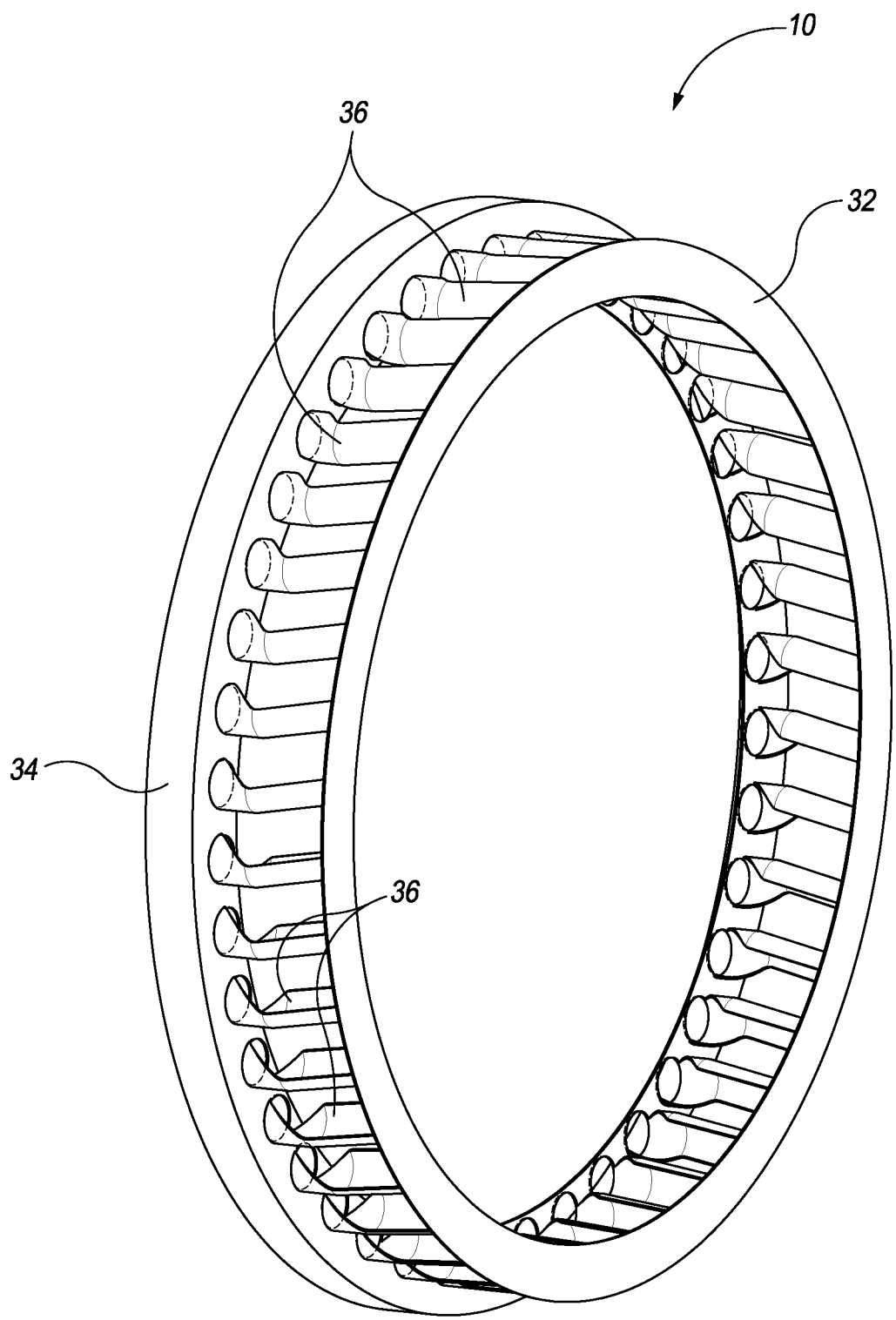
FIG. 4 is a frontside perspective view of the detachable airplane wheel prerotation/landing brake cooling device shown in FIGS. 2 and 3 (and partially shown in FIG. 1).
Figure 5:
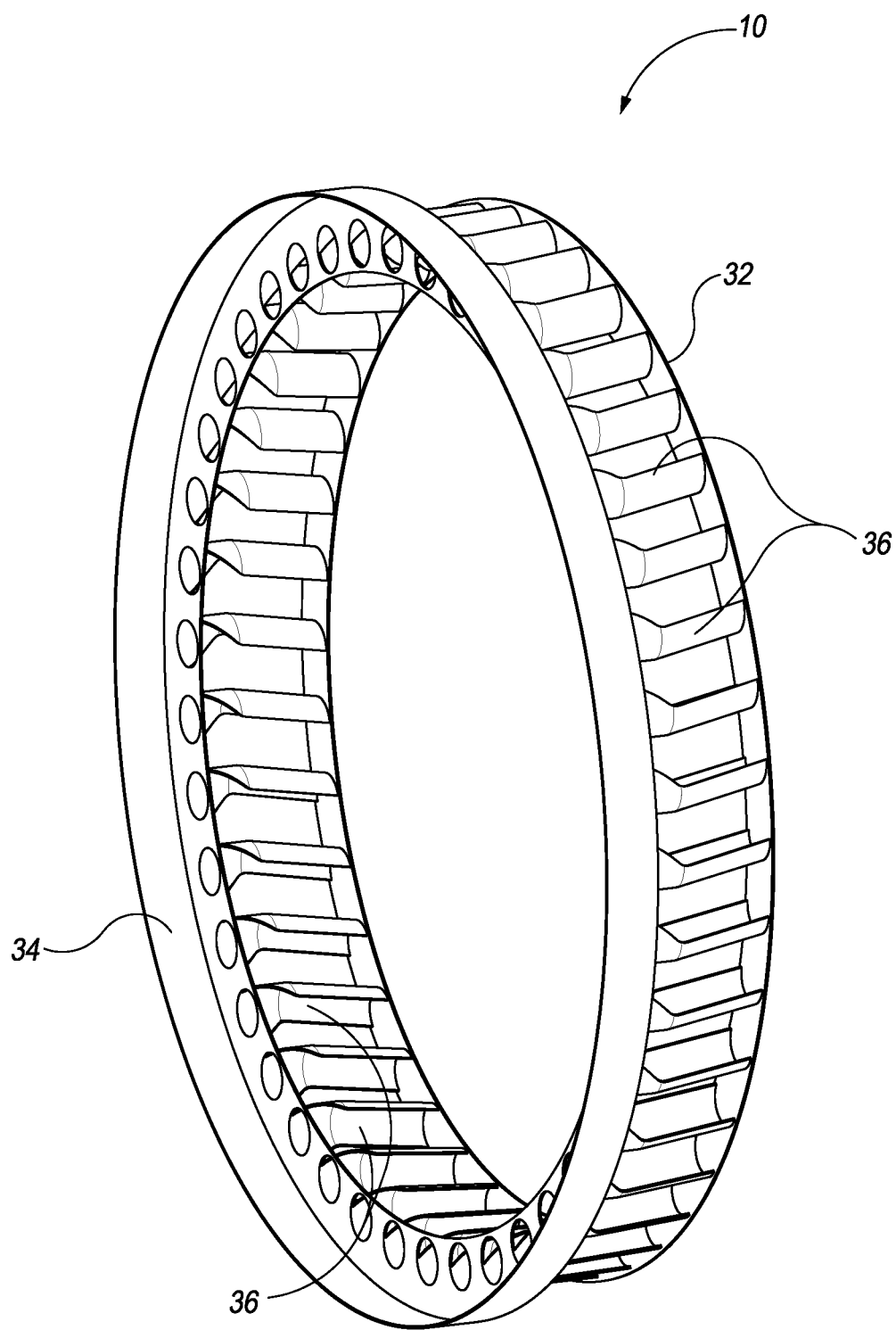
FIG. 5 is a backside perspective view of the detachable airplane wheel prerotation/landing brake cooling device shown in FIG. 4.

As best shown in FIGS. 4 and 5, the detachable airplane wheel prerotation/landing brake cooling device 10 comprises an outer circular cage rim 32, an inner circular cage rim 34 confronting and spaced apart from the outer circular cage rim 32, and a plurality of spaced apart arcuate blades 36 spanning across and connecting the outer circular cage rim 32 to the inner circular cage rim 34. As shown, the inner circular cage rim 34 is fitted (preferably friction fitted with optional fasteners (not shown)) to the outer circular wheel rim 18 of the wheel 14 (on the inner side 24a of the wheel disk 24 adjacent to the disc brake assembly 26). In some embodiments, the inner circular cage rim 34 is friction fitted to a circular wheel lip 21 of the outer circular wheel rim 18.

Figure 6:
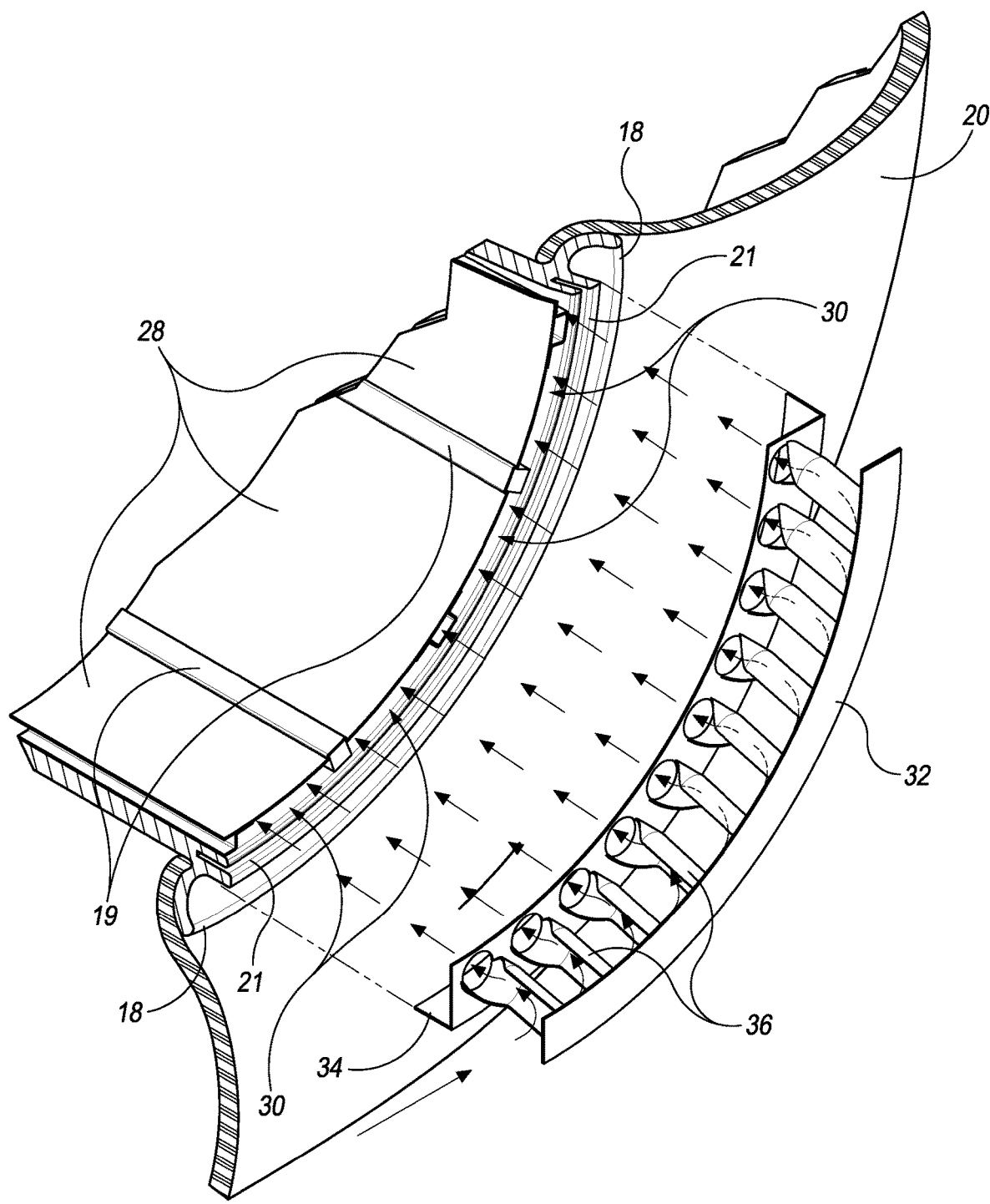
FIG. 6 is a partial cut-away view the detachable airplane wheel prerotation/landing brake cooling device shown in FIGS. 4 and 5 detached and positioned away from the tire and the outer circular wheel rim, and depicting by way arrows the airstream being funneled over the curved heat shields and the disc brake assembly and into curved annular spaces.

In addition, and as best shown in FIG. 6, each arcuate blade 36 includes a first straight section connected to the outer circular cage rim 32 and to inner circular cage rim 34. In some embodiments (not shown), each arcuate blade 36 is twisted. In other embodiments, the detachable airplane wheel prerotation/landing brake cooling device 10 is made of a hard, resilient, plastic (noting that the inventor's current prototype is made of metal).

The plurality of arcuate blades 36 are, when the detachable airplane wheel prerotation/landing brake cooling device 10 is being impinged by an airstream (depicted by arrows in FIG. 6) during the landing of the airplane, configured to (i) rotate the wheel 14 about the axle 16 in a forward direction (i.e., opposite the direction of the airstream), and (ii) funnel air into the plurality of annular spaces 30 adjacent to the plurality of heat shields 28 to thereby remove heat away from the disc brake assembly 26. In this regard, each of the plurality of spaced apart arcuate blades 36 have a windward face and a leeward face. As shown, each of the plurality of spaced apart arcuate blades 36 is slanted in order to direct airflow inward. In this configuration, the airstream is able to prerotate (spin) the wheels 14 in a forward direction, while simultaneously redirecting a portion of the airstream into the plurality of annular spaces 30 adjacent to the plurality of heat shields 28 to thereby remove heat away from the disc brake assembly 26.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing descriptions, and all changes that come within the meaning and range of equivalency of the claims are to be embraced within their scope.

What is claimed is:

1. A detachable airplane wheel prerotation/landing brake cooling device in combination with a landing gear assembly of an airplane, wherein the landing gear assembly includes (i) a rotatable wheel positioned about an axle, wherein the wheel includes an outer circular wheel rim, a tire about the wheel rim, an inner hub, and a wheel disk connecting the inner hub to the outer wheel rim, wherein the wheel disk has an inner side and an outer side, and (ii) a disc brake assembly positioned adjacent to the inner side of the wheel disk, wherein the disc brake assembly includes a plurality of brake pads positioned on opposite sides of a plurality disc brake rotors axially aligned with the axle, and a plurality of curved heat shields circumferentially about the axle and adjacent to, and between, the outer wheel rim and the axially aligned disc brake rotors, wherein the plurality of curved heat shields define a plurality of curved spaces between the outer wheel rim and the plurality of curved heat shields, the detachable airplane wheel prerotation/landing brake cooling device, comprising:

an outer circular cage rim;

an inner circular cage rim confronting and spaced apart from the outer circular cage rim, wherein the inner circular cage rim is fitted to the outer circular wheel rim of the wheel on the inner side of the wheel disk adjacent to the disc brake assembly; and a plurality of spaced apart arcuate blades spanning across and connecting the outer circular cage rim to the inner circular cage rim, wherein the inner circular cage rim includes a plurality of spaced apart circular openings, wherein each arcuate blade is twisted and connected to the outer circular cage rim and to the inner circular cage rim at a slant and at a respective circular opening of the plurality of spaced apart circular openings, wherein the plurality of arcuate blades are, when the detachable airplane wheel prerotation/landing brake cooling device is being impinged by an airstream during the landing of the airplane, configured to (i) rotate the wheel about the axle in a forward direction, and (ii) funnel air through the plurality of spaced apart circular openings and into the plurality of curved spaces adjacent to the plurality of heat shields to thereby remove heat away from the disc brake assembly.

2. The detachable airplane wheel prerotation/landing brake cooling device according to claim 1 wherein the inner circular cage rim is friction fitted to a circular wheel lip of the outer circular wheel rim.

3. The detachable airplane wheel prerotation/landing brake cooling device according to claim 1 made of a hard, resilient, plastic.

* * * * *